United States Patent
New

(10) Patent No.: US 7,830,777 B2
(45) Date of Patent: Nov. 9, 2010

(54) SYSTEM AND METHOD FOR SELECTIVELY ENABLING OR DISABLING AN OPTICAL DEVICE USING OPTICAL BLOCKING MATERIAL ON AN ENERGY MASKED AREA OF THE OPTICAL DEVICE

(75) Inventor: Anthony New, Terre Haute, IN (US)

(73) Assignees: Sony Corporation, Tokyo (JP); Sony DADC US Inc., Terre Haute, IN (US)

( * ) Notice: Subject to any disclaimer, the term of this patent is extended or adjusted under 35 U.S.C. 154(b) by 960 days.

(21) Appl. No.: 11/656,932

(22) Filed: Jan. 24, 2007

(65) Prior Publication Data

US 2007/0170606 A1 Jul. 26, 2007

Related U.S. Application Data

(60) Provisional application No. 60/762,093, filed on Jan. 25, 2006.

(51) Int. Cl.
*G11B 20/00* (2006.01)
(52) U.S. Cl. ........................................................ 369/273
(58) Field of Classification Search .................. 369/273
See application file for complete search history.

(56) References Cited

U.S. PATENT DOCUMENTS

| | | | |
|---|---|---|---|
| 7,127,066 B2 * | 10/2006 | Solomon et al. | 380/201 |
| 7,355,944 B2 * | 4/2008 | van de Grampel et al. | 369/53.1 |
| 7,417,713 B2 * | 8/2008 | Smith et al. | 355/67 |
| 7,596,067 B2 * | 9/2009 | Hanks et al. | 369/53.1 |
| 7,653,919 B2 * | 1/2010 | Potyrailo et al. | 720/718 |
| 2006/0239155 A1 | 10/2006 | New et al. | |
| 2007/0115762 A1 * | 5/2007 | Wisnudel et al. | 369/13.56 |
| 2007/0141293 A1 * | 6/2007 | Wisnudel et al. | 428/64.2 |
| 2007/0231743 A1 * | 10/2007 | Selinfreund et al. | 430/270.15 |

FOREIGN PATENT DOCUMENTS

WO  WO 2006-116493 A2  11/2006

* cited by examiner

*Primary Examiner*—Mark Blouin
(74) *Attorney, Agent, or Firm*—Rader, Fishman & Grauer PLLC

(57) ABSTRACT

A system for selectively enabling or disabling an optical device, such as an optical disc, includes an optical blocking material bonded or otherwise integrated into the optical device. In a specific embodiment, the optical blocking material includes a dye, such as an energy-sensitive dye. The optical blocking material is initially applied to the optical device during production using a spin coating or other suitable technique. An area of the optical device that will prevent a function of the device is then masked, and sufficient energy is applied to the unmasked area to activate the optical blocking material of the unmasked area while leaving the masked area unactivated. In a specific embodiment, the masked area corresponds with a lead-in area of an optical disc. The optical blocking material of the masked area remains non-transparent to disable the optical device until a second application of energy at a retail location.

28 Claims, 6 Drawing Sheets

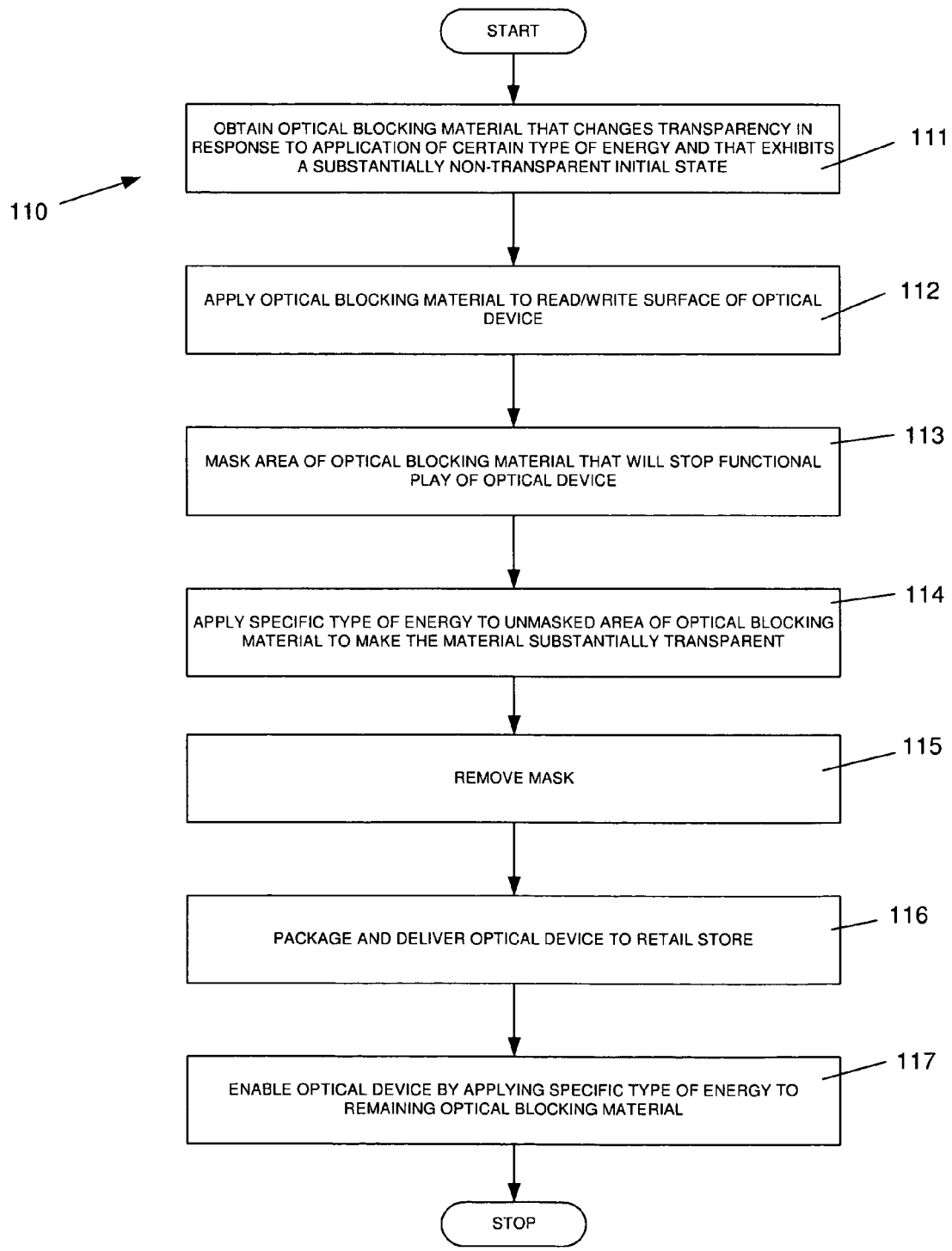

SYSTEM AND METHOD FOR SELECTIVELY ENABLING OR DISABLING AN OPTICAL DEVICE USING OPTICAL BLOCKING MATERIAL ON AN ENERGY MASKED AREA OF THE OPTICAL DEVICE

CROSS REFERENCE TO RELATED APPLICATIONS

This invention claims the benefit under 35 U.S.C. §119 of U.S. Provisional Application Ser. No. 60/762,093, entitled ENERGY MASKING FOR PRODUCTION OF ANTI-SHRINK PRODUCTS, filed on Jan. 25, 2006. This application also relates to the U.S. application Ser. No. 11/410,478, filed on Apr. 24, 2006. These applications are hereby incorporated by reference in their entirety.

BACKGROUND OF THE INVENTION

1. Field of the Invention

The present invention relates generally to product activation systems and methods, and in particular, to systems and methods for selectively activating optical devices.

2. Description of the Related Art

For the purposes of the present discussion, an optical device may be any device or medium that relies on optics to function properly. Examples of optical devices include, but are not limited to, Compact Discs (CDs), Digital Video Discs (DVDs), High Density DVDs (HD-DVDs), Blu-ray discs, and so on.

Systems and methods for selectively activating products are employed in various demanding applications including product theft-prevention, rental-return enforcement, and copyright infringement. Such applications often demand cost-effective systems that are difficult to circumvent, yet convenient to control with the appropriate equipment.

Systems for selectively activating products are particularly important in theft-prevention applications involving readily-shoplifted optical devices, such as CDs and DVDs. Conventionally, such optical devices are often tagged with a theft-prevention device, such as a sticker or a Radio Frequency Identification Tag (RFID) that is deactivated upon purchase. When deactivated, the devices prevent alarm-triggering tag functions from triggering alarms when a customer exits a merchandise outlet, such as a store.

Unfortunately, thieves may often readily notice and remove such tags. Furthermore, RFID tags may undesirably increase product costs and may further emit undesirable radio frequencies even after deactivation. For example, such frequencies may not be approved by the Federal Aviation Administration (FAA) for in-flight use.

Related application Ser. No. 11/410,478 describes a system for selectively enabling and disabling optical devices. It uses an optical blocking material covering an entire readable surface of the optical device. However, the energy required to activate such optical devices within a desired activation time (e.g., 1 to 3 seconds) is believed to be too large to be used safely in a retail setting. At acceptable energy levels, the activation process is considered too slow.

SUMMARY OF THE INVENTION

The present invention accommodates selectively enabling or disabling an optical device, such as an optical disc.

In one embodiment, the system includes an optical blocking material integrated (e.g., bonded or otherwise integrated) into the optical device during production. For example, the optical blocking material can be applied to the optical device using a spin coating technique. An area of the optical device that will prevent functional play or other desired function of the device is then masked, and a sufficient energy is applied to the unmasked area during the production process to activate the optical blocking material of the unmasked area. Activation of the optical blocking material causes the material to change from a non-transparent condition into a transparent condition. The optical blocking material of the masked area remains unactivated. For example, the masked area corresponds with a lead-in area or file system boot area of an optical disc. By keeping the optical blocking material over the lead-in area or file system boot area unactivated (i.e., non-transparent), the optical device will remain disabled. A second application of energy can be applied at retail or other supply chain locations to activate the remaining optical blocking material to enable the optical device.

In one embodiment, the optical blocking material includes a dye, such as an energy-sensitive dye. The optical device includes an optical disc, such as CD or DVD. The energy source for activating the optical blocking material will be selected to match the properties of the optical blocking material. For example, certain materials can be activated to change from a non-transparent condition into a transparent condition upon application of ultraviolet light, or other suitable energy from a laser system, ultrasound system, or infrared transmitter.

According to one aspect, the present invention provides a method of manufacturing an optical device, comprising: applying an optical blocking material to at least a portion of the optical device; masking an area of the optical blocking material that will prevent a function of the optical device while leaving a remaining area unmasked; and applying sufficient energy to the unmasked area of the optical device to activate the optical blocking material while leaving the masked area unactivated.

According to another aspect, the present invention provides a system for inhibiting theft of an optical device is provided, the system comprising: an optical blocking material bonded or otherwise integrated into the optical device, the material having an initially non-transparent state; and a first portion of the optical blocking material being activated into a transparent state, while a second portion of the optical blocking material remaining in a non-transparent state, the second portion being sufficient to stop a function of the optical device. The first portion of the optical blocking material is activated into a transparent state by a first energy source during manufacture of the optical device, and the second portion of the optical blocking material is activated into a transparent state by a second energy source associated with a retail location.

According to another aspect, an optical disc is provided, comprising: an optical blocking material bonded or otherwise integrated into the disc, the material having an initially non-transparent state; and a first portion of the optical blocking material being activated into a transparent state, while a second portion of the optical blocking material remains in a non-transparent state, the second portion covering a sufficient area of the optical disc to prevent a function of the optical disc.

The specific embodiments described herein may be employed to enable optical devices at the time of purchase using time and energy levels that are acceptable in a retail setting. The present invention provides a cost-effective solution to inhibiting theft of optical devices that meets customer requirements for speed and effectiveness.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 13 is a flow chart of the process used for manufacturing and enabling optical devices equipped with the theft prevention system of the present invention.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

An optical device may be any device or medium that employs optical energy to function as desired. An optical device may include any optical disc employed to store, provide, and/or manipulate data using selective application of optical energy. An optical disc may employ a beam of optical energy for reading and/or writing data to/from the optical disc. Examples of optical discs include, but are not limited to, Digital Video Discs (DVDs), Compact Discs (CDs), CD Recordable (CDR) media, CD Read/Write (CDRW) media, Blu-Ray discs, High-Density (HD) discs, optical memory cards, credit cards, Subscriber Identity Module (SIM) cards, and so on.

Figure 1:
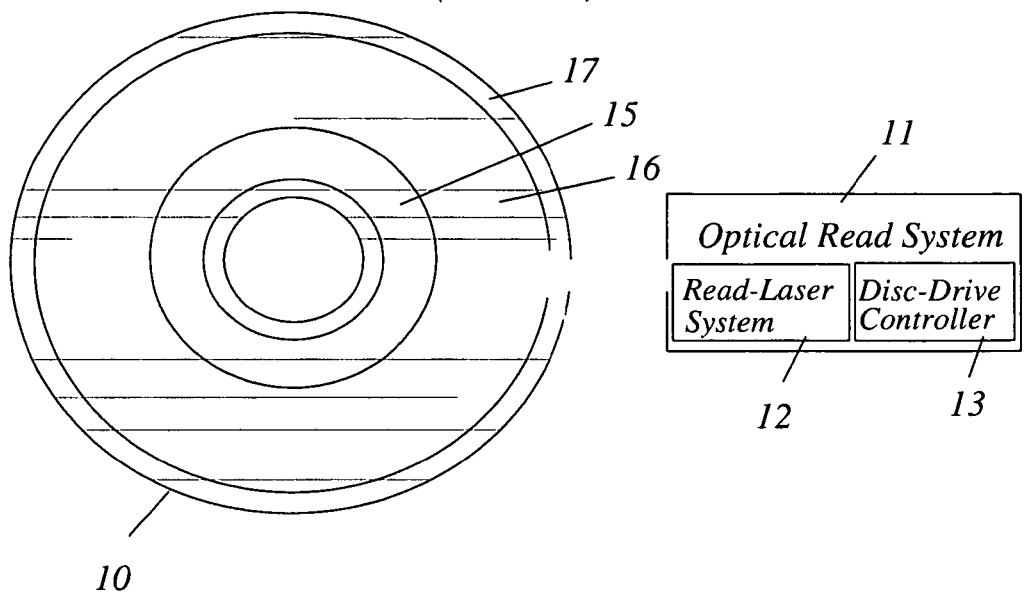
FIG. 1 illustrates a conventional optical disc with a conventional optical read system.

FIG. 1 illustrates a conventional optical device 10, such as an optical disc. The optical device 10 includes a spiral track, which is strategically pitted to encode information that is readable by an optical read system 11. The optical read system 11 includes a read-laser system 12 in communication with a disc-drive controller 13. The drive controller 13 may include a control algorithm and an accompanying actuator for controlling the read-laser system 12. The read-laser system 12 may include one or more optical pickups, Digital-to-Analog Converters (DACs), amplifiers, and so on.

The read-laser system 12 produces a laser beam 14, which reflects off of patterned pits included in the spiral track on the optical device 10. The pattern of reflected light may be employed by the optical read system 11 or an accompanying computer to decode information encoded on the optical device 10 via the pits.

The conventional optical device 10 shown in FIG. 1 has a lead-in area 15 containing the table of contents for the device, a program area 16 containing individual tracks with blocks of data, and a lead-out area 17. The lead-in area 15 must be accessible on the device 10 to enable functional play. If the lead-in area 15 is not visible or is corrupted, the device 10 becomes unplayable. Unplayability can also be accomplished by blocking access to a particular file system boot area on the optical device 10, such as any of the file system's volume descriptors. These volume descriptors typically reside near the beginning of the volume space. As an example, in the case of DVD discs, the descriptors may be located from sector numbers 0 through 256. Also, path tables, directory records and file descriptors that are located after or near this same area and are blocked can cause discs to not play.

Figure 2:
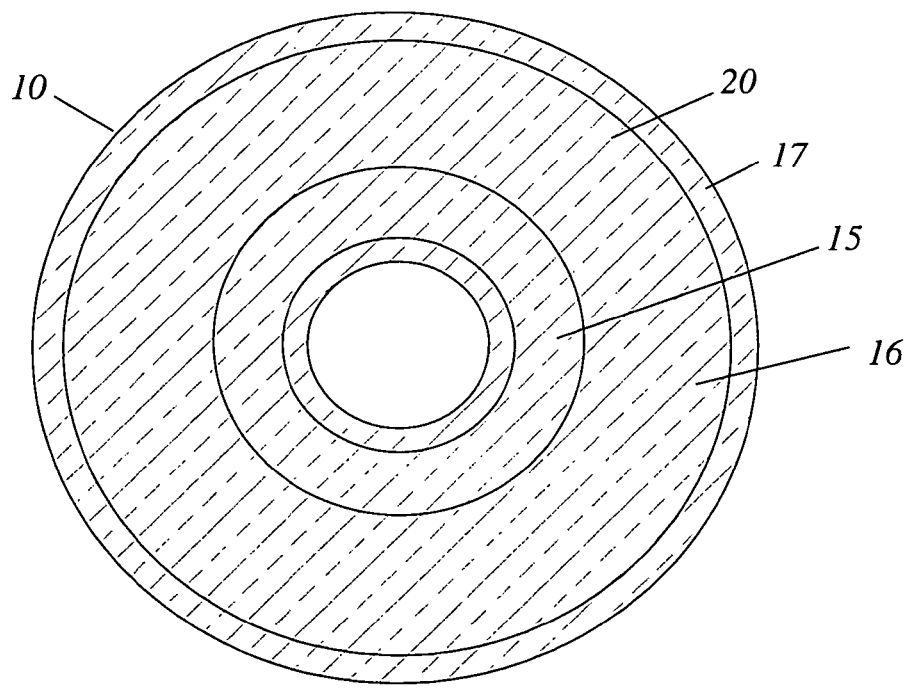
FIG. 2 illustrates the optical disc coated with an optical blocking material that may be activated to change from an initial non-transparent condition into a transparent condition.
Figure 3:
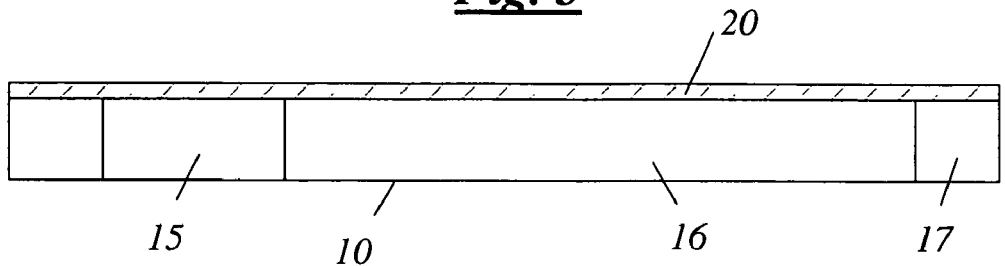
FIG. 3 is a cross section view of one side of the coated optical disc shown in FIG. 2.
Figure 4:
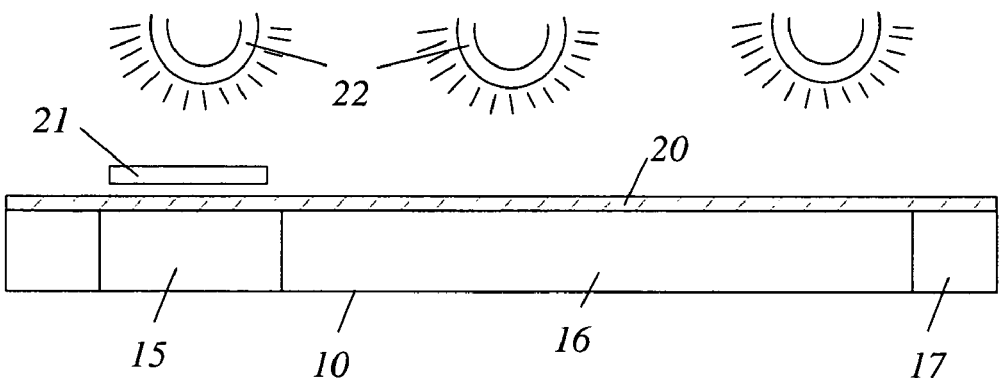
FIG. 4 is a cross section view showing a mask positioned over a portion of the coated optical disc and light energy being applied to activate the unmasked portion of the optical blocking material.

The present invention uses an optical blocking material 20 to selectively enable and disable the optical device 10. As shown in FIGS. 2 and 3, the optical blocking material 20 is initially applied to an entire surface of the optical device 10 using a spin coating process or other suitable technique. As described in related application Ser. No. 11/410,478, the optical blocking material can be applied over the polycarbonate outer layer of an optical disc, under the polycarbonate layer, or beneath the polycarbonate layer. The optical blocking material can also be incorporated into the polycarbonate layer. The optical blocking material can thus be integrated into the optical device 10 in a variety of ways.

In the spin coating process, the optical blocking material 20 is combined with a-solvent and sprayed or poured onto the surface of the disc substrate. The disc 10 is then rotated at a high speed to spread the material 20 by centrifugal force. Rotation is continued while the excess material and fluid spins off the edges of the substrate, until the desired thickness of the optical blocking material 20 is achieved on the surface of the disc 10. The thickness of the optical blocking material 20 can be controlled by changing the rotation speed, rotation duration, and/or concentration of the solution and solvent. Current spin-coating equipment used in the manufacture of optical discs can be used to apply the optical blocking material.

The optical blocking material 20 can be a photosensitive ink or dye and may be any ink or dye or other material that changes color or transparency in response to specific energy. The optical blocking material 20 is preferably a material that can be applied in a thin layer, which changes nature, such as color or transparency, in response to application of energy, such as optical energy, vibrational energy, or acoustic energy. Optical energy may be any energy within a portion of the electromagnetic spectrum between and including ultraviolet and radio frequencies. In other embodiments, energy other than optical energy may be employed to selectively change the transmissive properties of the optical blocking material 20.

The optical blocking material 20 can comprise various types of ink, azo ink, or ink made by Veriloc, Inc. without departing from the scope of the present invention. Other suitable inks include readily available CD-R and DVD-R recording dyes, including cyanine and phthalocyanine azo dyes, which are reactive to ultrasonic degradation in addition to optical degradation at specific wavelengths and intensities. Exemplary dies also include various types of recording dyes used for Write Once Read Many (WORM) discs, and so on. Such dyes are relatively inexpensive and have characteristics that are suitable for use with embodiments of the present invention.

As used in the present application, the terms "transparent" and "non-transparent" are used to describe the relative transmissive properties of the optical blocking material 20 in its activated and unactivated conditions. The term "non-transparent" refers to any condition of the optical blocking material 20 that prevents the optical device from being read or written to by an optical read system 11, even if such condition has some limited transparency (i.e., less transparency than the activated condition of the optical blocking material, but not completely opaque). The term "non-transparent" also includes a condition of the optical blocking material 20 being partially reflective or exhibiting a specific color that prevents the optical read system 11 from reading the optical device 10. The term "transparent" refers to the optical blocking material 20 being sufficiently transparent or non-reflective to enable the read system 11 to read the optical device 10.

Once the optical blocking material 20 is applied to the optical device 10 by spin coating or the like, an area of the optical blocking material 20 that will prevent a function of the optical device 10 is covered by a mask 21. The masked area is selected as an area of the disc 10 that is necessary to enable functional play or a particular function of the disc 10. For example, the lead-in area 15, the file system's volume descriptor data, path tables, directory records, or file descriptors on the optical device 10 can be masked, while leaving the remaining area of the optical device 10 unmasked.

A sufficient energy is then applied to the unmasked area of the optical device 10 to activate that portion of the optical blocking material 20 while leaving the area under the mask 21 unactivated. In the specific embodiment described herein, the optical blocking material 20 is a photosensitive dye that has a non-transparent condition until the material is activated by light energy from an energy source 22, at which time the material becomes transparent. The specific energy used to activate the optical blocking material 20 can be selected based on the particular type of optical blocking material used. For example, ultraviolet light, infrared energy, ultrasonic energy, or vibrational energy can be used for certain types of optical blocking material 20.

Figure 5:
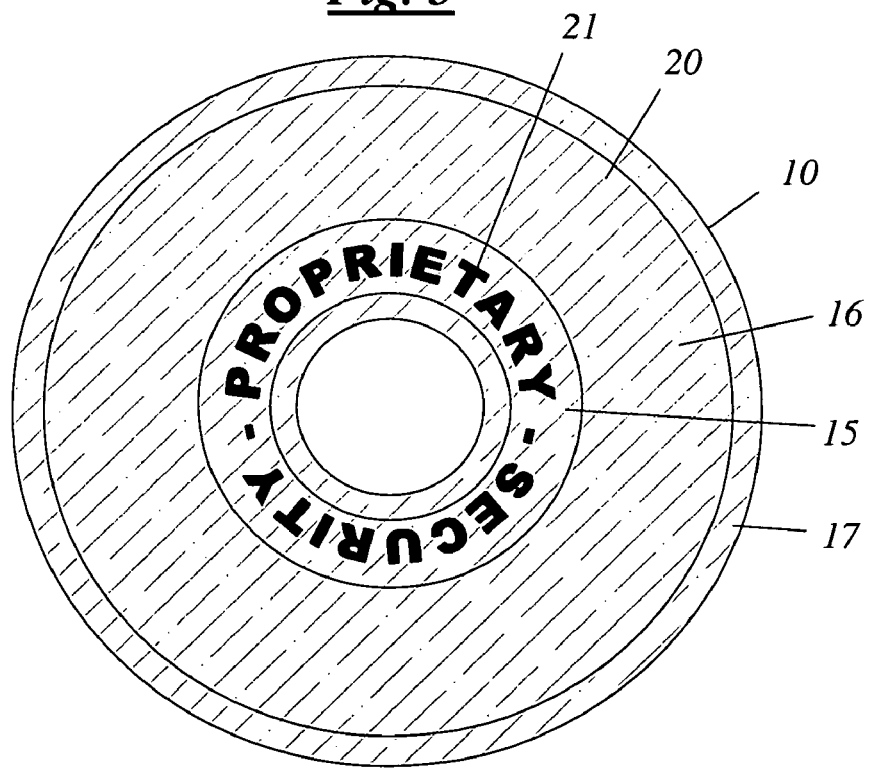
FIG. 5 illustrates a plan view of the mask positioned over the optical disc.

As shown in FIG. 5, the mask 21 can be in the form of a pattern of text. For example, the mask 21 can be a circular or ring-shaped adhesive label made of transparent material with printed text thereon. The printed text of the mask 21 will block the energy source 22 from activating the optical blocking material 20 beneath the text, while the transparent material of the adhesive label will allow the optical blocking material 20 surrounding the text to be activated. The text pattern created by this mask 21 will be sufficient to stop functional play of the optical device 10, while reducing the amount of material 20 that must be activated later to enable the optical device 10. For another example, the mask 21 can be a reusable tooling component that is placed over the optical device 10 while energy is applied to the unmasked area of the optical device 10.

Figure 6:
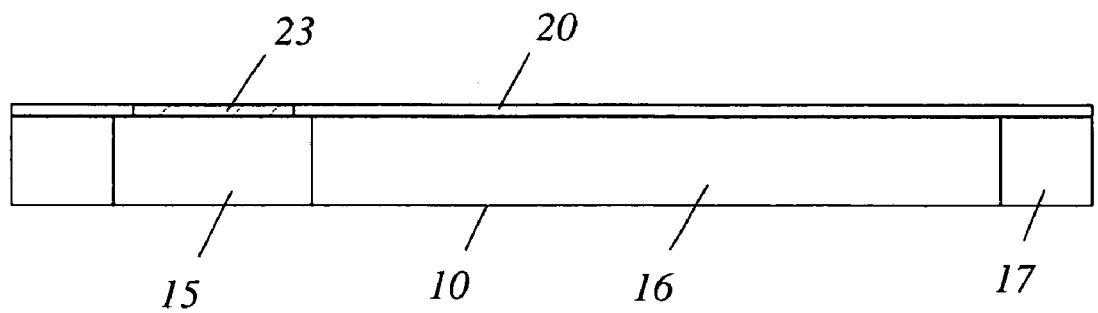
FIG. 6 is a cross section view of the optical disc showing the unactivated portion of the optical blocking material after removing the mask.
Figure 7:
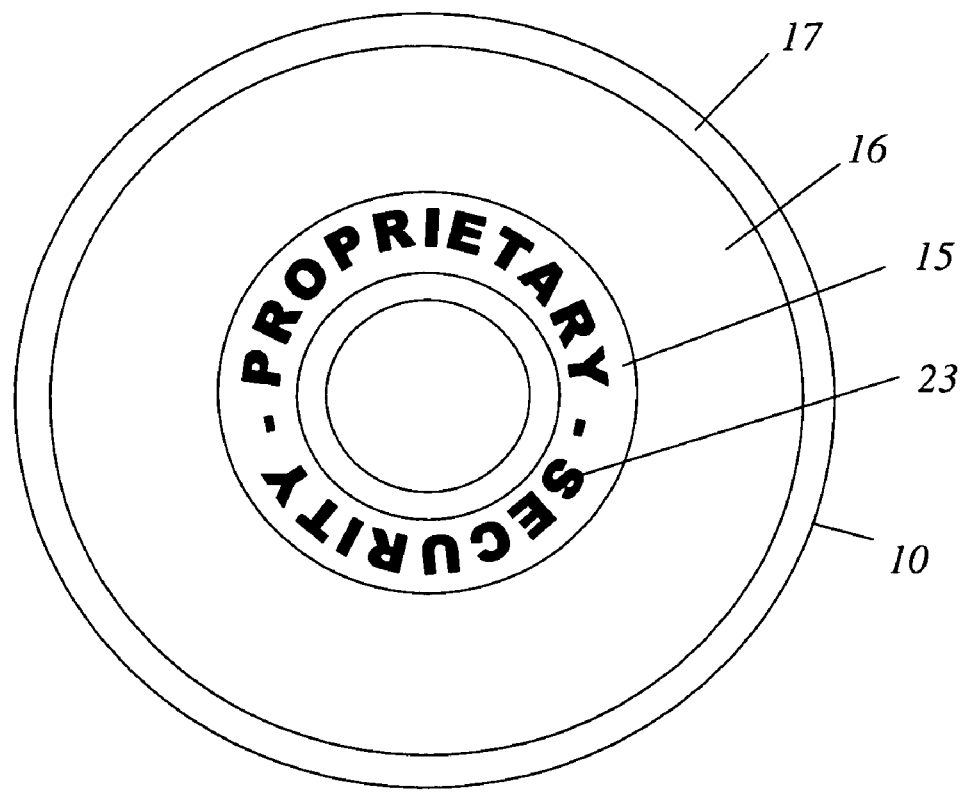
FIG. 7 illustrates a plan view of the optical disc showing the unactivated portion of the optical blocking material after removing the mask.
Figure 8:
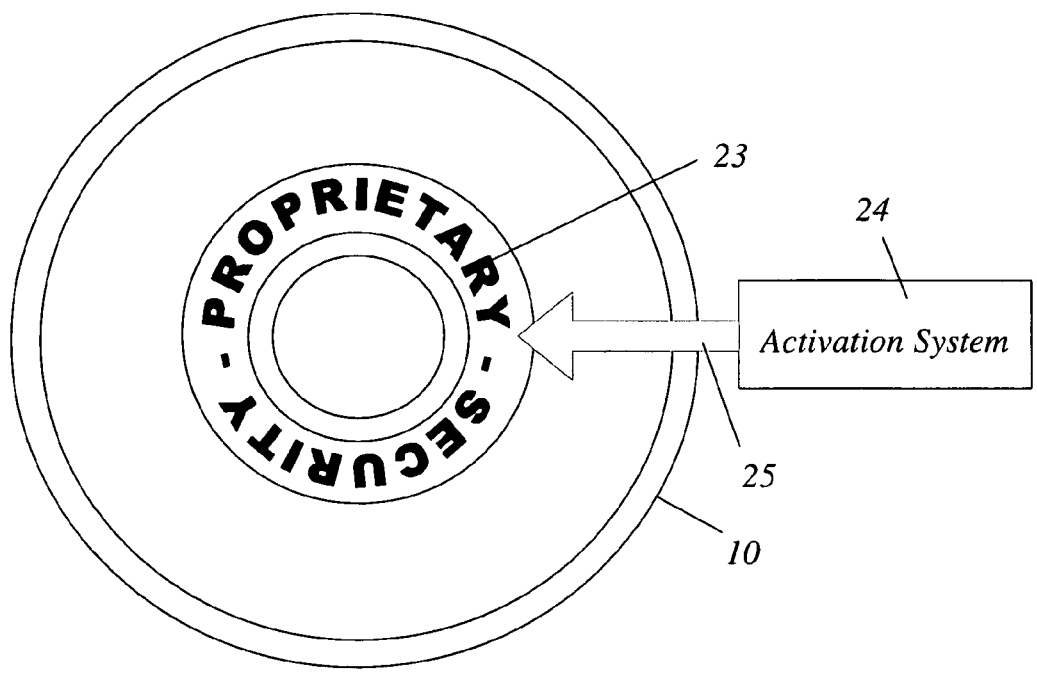
FIG. 8 illustrates an activation system used to activate the optical disc at retail or other supply chain locations.
Figure 9:
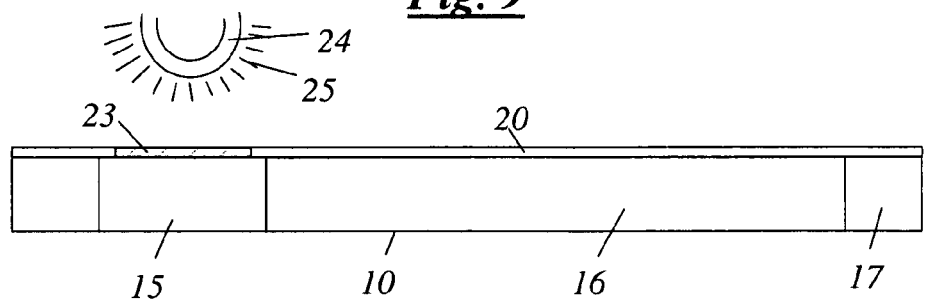
FIG. 9 is a cross section view of the activation system being used to activate the optical disc at retail or other supply chain locations.
Figure 10:
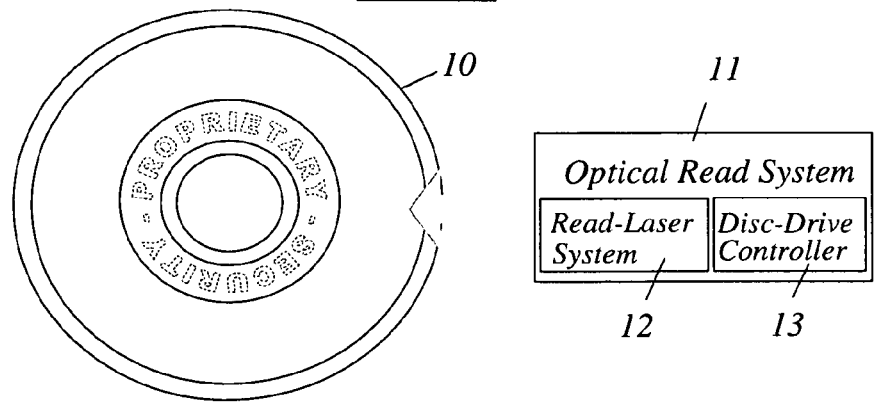
FIG. 10 illustrates an activated optical disc being used with a conventional optical read system.

FIGS. 6 and 7 illustrate the optical device 10 after energy is applied to the unmasked area and the mask 21 is removed. The portion 23 of the optical blocking material 20 that was shielded by the mask 21 from activation remains on the optical device 10 and covers a sufficient area of the optical device 10 to prevent functional play. The optical device 10 can then be packaged and shipped to a retail store or supply chain location in an unactivated condition.

The present invention provides a new production method for selectively enabled optical devices 10 that removes excess optical blocking material 20 during the production process without affecting production speed or contaminating recycled material. The production method produces a product that meets a customer demand for final activation time at the retail point of sale of 1 to 3 seconds. Since the amount of energy and time required to activate a spot of optical blocking material is proportional to the number of molecules that need to be activated, the prior activation of the unmasked optical blocking material 20 during production results in a smaller amount of energy and time required for activation at the retail or supply chain location. Only the minimal amount of material required to prevent functional play of the optical device 10 remains to be activated at the retail or supply chain location.

An activation system 24 is provided at the retail store or supply chain location. The activation system 24 applies energy 25 to the remaining optical blocking material 23 on the optical device 10 to activate the optical device 10. The activating energy 25 applied by the activation system 24 is selected according to the type of optical blocking material 20 used, and will generally match the type of energy used during the production process (e.g., ultraviolet, infrared, ultrasonic, vibration, etc.). The optical blocking material 20 can be formulated to require a certain wavelength and/or intensity of light or other type of energy to change its transparency. The exact activation energy 25 required for activation may be difficult for an unauthorized user or thief to determine.

Figure 11:
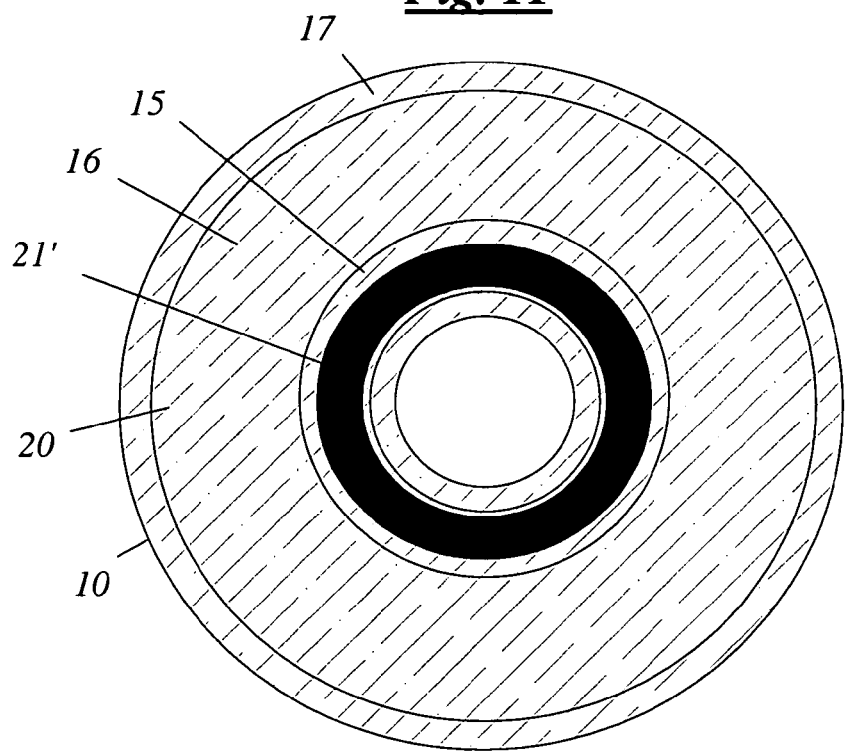
FIG. 11 illustrates an alternative embodiment in which a ring-shaped mask is positioned over the optical disc during production.
Figure 12:
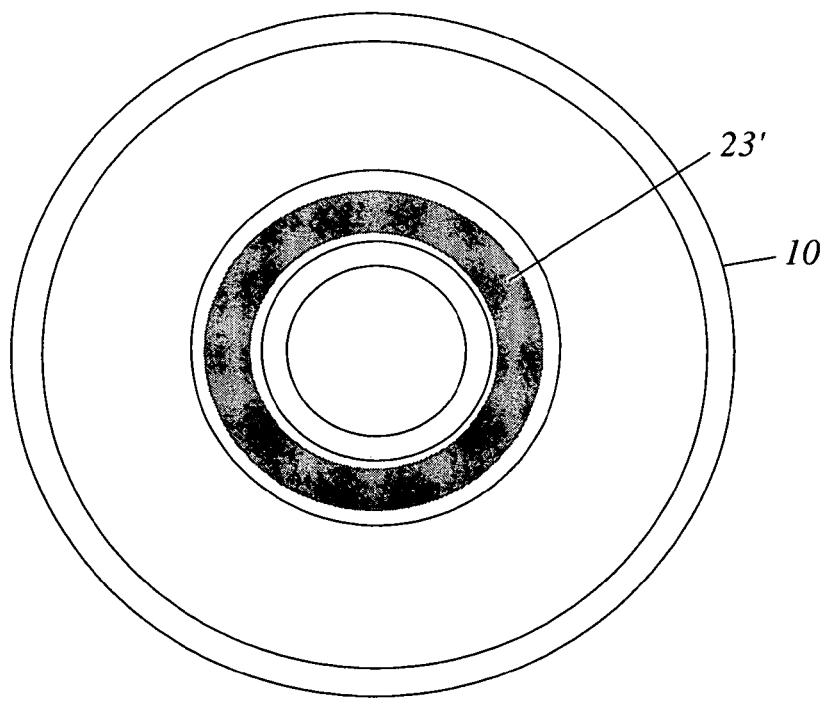
FIG. 12 illustrates a plan view of the optical disc showing the unactivated portion of the optical blocking material after removing the mask shown in FIG. 11.

As shown in FIG. 11, the mask 21' can also be in the form of a ring that covers a select portion of the optical disc 10 to disable functional play or other desired function of the disc 10. For example, a ring 23' of unactivated material 20 produced by the mask 21' can cover a substantial part of the lead-in area 15 of the optical device 10 to disable the device. FIG. 12 illustrates the optical device 10 after the ring-shaped mask 21' is removed leaving a ring-shaped area 23' of unactivated, non-transparent material to prevent functional play.

The portion of optical blocking material 20 activated during the production process is larger than the portion 23, 23' activated at the retail or supply chain location. As a result, the amount of activation energy 25 used at the retail or supply chain location can be substantially less than the amount of activation energy used to activate the unmasked portion during the production process. Further, the duration and intensity of the energy 25 applied by the activation system 24 at the retail or supply chain location is substantially reduced as compared to what would be required to activate the entire optical device 10. This allows the final activation of the optical device 10 to be performed quickly and efficiently, thereby satisfying customer time demands and other constraints on the final activation system 24. Once activated, the optical device 10 can then be used in a normal manner.

In practice, the activation system 24 at the retail or supply chain location will employ an activating energy beam 25 to selectively change the transparency of the optical blocking material 23, 23' to activate the optical device 10 as needed. A user, such as a retail store clerk or other supply chain employee, may control the activation system 24 at the time of purchase or movement through the supply chain. Alternatively, the activation system 24 can be automatically controlled at the desired location, or controlled by another device, such as a cash register, in response to payment for the optical device 10 at the retail location.

Infrared and/or ultra sound equipment sufficient to activate an optical blocking material 23, 23' on an optical device is readily deployable in merchant checkout devices. Various embodiments of the present invention may induce optical changes in the optical blocking material to implement various features, including, but not limited to, security and authentication features for supply-chain management, selective activation of a subset of available features of an optical device, and so on.

Various embodiments of the present invention may provide important capabilities and features for merchants of various optical products, such as CDs and DVDs. Such capabilities and features include simple and reliable one-time activation at the point of sale; extended exposure to direct sunlight will not activate the optical device; activation time of 1 to 3 seconds at the point of sale; activation through product packaging, including product cases; difficult to reverse engineer the activation system; may be cost effectively implemented;.and may not degrade the long term performance of the accompanying optical device.

Those skilled in the art may construct optical blocking materials and associated activation equipment to selectively alter the chemistry of the materials to affect transparency without undue experimentation. Conventional systems for inducing changes in material chemistry may be adapted for use with embodiments of the present invention without departing from the scope thereof.

FIG. 13 illustrates a flow diagram of a method 110 adapted for use with the embodiments of FIGS. 1 to 12. The method 110 includes an initial material-obtaining step 111, which involves obtaining an optical blocking material 20 that changes transparency in response to application of a certain type of energy. The optical blocking material 20 can be, for example, an azo dye, which changes transparency in response to a specific frequency and amplitude of optical energy. In the specific embodiment described herein, the optical blocking material 20 exhibits an initial non-transparent state. The material can be any suitable ink, dye, or other material with modifiable optically transmissive properties.

A subsequent applying step 112 includes applying the optical blocking material 20 to a surface or layer of an optical device 10, such as a read/write surface, through which light must pass to enable effective operation of the optical device 10. The optical blocking material 20 is applied in thick enough layers and/or in sufficient concentrations to disable operation of the device 10.

After the optical blocking material 20 is applied to the optical device 10, a masking step 113 is performed by placing a mask 21 over an area of the optical blocking material 20 that will prevent a function of the optical device 10. In a specific embodiment, the mask 21 is placed over the optical blocking material 20 covering a lead-in area 15 of the optical device 10 to prevent functional play of the optical device.

An energy applying step 114 is then performed by applying a specific type of energy to the unmasked area of the optical blocking material 20. The energy is selected and applied at a sufficient intensity and duration to make the unmasked area of optical blocking material 20 change from a non-transparent condition into a transparent condition. The mask 21 is then removed at step 115, and the optical device 10 can be packaged and delivered to a retail store or supply chain location, as indicated by step 116. The portion 23 of the optical blocking material 20 that was masked during the energy application in step 114 remains in a non-transparent condition at this time so that the optical device 10 is disabled and less likely to be stolen or used before being properly purchased at the retail location.

At step 117 the optical device 10 is activated as needed at the retail location or supply chain location by applying a specific type of energy 25 to the remaining optical blocking material 23 that was masked during the earlier energy application step 114 in the production process. The energy 25 is selected and applied at a sufficient intensity and duration to make the remaining optical blocking material 20 change from a non-transparent condition into a transparent condition to activate the optical device 10.

While embodiments herein are discussed primarily with respect to one-time activation of an optical disc at a point of sale to prevent or thwart theft of the optical device, the invention is not limited thereto. For example, different materials or combinations thereof may be employed to enable multiple state changes for a given energy-sensitive layer, thereby allowing multiple activations and deactivations of an optical device. Multiple activations and deactivations may be particularly important in rental applications, such as movie rentals, where optical devices may need repeated activation and deactivation.

Although embodiments of the invention are discussed primarily with respect to systems and methods for inhibiting theft of an optical device by selectively enabling the optical device 10 after purchase, other uses and features are possible. Various embodiments discussed herein are merely illustrative, and not restrictive, of the invention. For example, energy-sensitive inks in accordance with the present teachings may be employed to thwart copyright infringement.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Thus embodiments of the present invention produce and provide systems and methods for selectively enabling and disabling optical devices. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method of manufacturing an optical device, comprising:
    applying an optical blocking material to at least a portion of the optical device;
    masking an area of the optical blocking material that will prevent a function of the optical device while leaving a remaining area unmasked; and
    applying sufficient energy to the unmasked area of the optical device to activate the optical blocking material while leaving the masked area unactivated.

2. The method of manufacturing according to claim 1, wherein said optical blocking material is non-transparent until the material is activated by energy.

3. The method of manufacturing according to claim 1, wherein said energy includes ultraviolet light.

4. The method of manufacturing according to claim 1, wherein said energy includes infrared energy.

5. The method of manufacturing according to claim 1, wherein said energy includes ultrasonic energy.

6. The method of manufacturing according to claim 1, wherein said energy includes vibrational energy.

7. The method of manufacturing according to claim 1, wherein said optical device is an optical disc.

8. The method of manufacturing according to claim 7, wherein said optical blocking material is applied to the disc by a spin coating process.

9. The method of manufacturing according to claim 1, wherein said optical blocking material comprises a material that changes transparency in response to selective application of energy.

10. The method of manufacturing according to claim 1, wherein said optical blocking material comprises a photosensitive dye.

11. The method of manufacturing according to claim 1, wherein said optical blocking material is applied over an entire readable surface of the optical device.

12. The method of manufacturing according to claim 1, wherein said masked area produces a pattern of text on the optical device.

13. The method of manufacturing according to claim 1, wherein said masked area produces a ring of unactivated optical blocking material on the optical device.

14. The method of manufacturing according to claim 1, wherein said masked area of the optical blocking material comprises a non-transparent area that will prevent functional play of the optical device.

15. A system for inhibiting theft of an optical device, the system comprising:
    an optical blocking material bonded to or integrated into the optical device, said material having an initially non-transparent state; and
    a first portion of said optical blocking material being activated into a transparent state, while a second portion of said optical blocking material remaining in a non-transparent state, said second portion being sufficient to stop a function of the optical device.

16. The system according to claim 15, wherein the first portion of the optical blocking material is activated into a transparent state by a first energy source during manufacture of the optical device.

17. The system according to claim 16, wherein the second portion of the optical blocking material is activated into a transparent state by a second energy source associated with a retail location.

18. The system according to claim 17, wherein the first portion of optical blocking material comprises a greater area of the optical device than the second portion of optical blocking material.

19. The system according to claim 17, wherein an amount of energy applied by the first energy source is greater than an amount of energy applied by the second energy source.

20. The system according to claim 15, wherein said second portion of the optical blocking material is sufficient to prevent functional play of the optical device.

21. An optical disc, comprising:
    an optical blocking material bonded to or integrated into the disc, said material having an initially non-transparent state; and
    a first portion of said optical blocking material being activated into a transparent state, while a second portion of said optical blocking material remaining in a non-transparent state, said second portion covering a sufficient area of the optical disc to prevent a function of the optical disc.

22. The optical disc according to claim 21, wherein said second portion covers a substantial part of a lead-in area of the optical disc.

23. The optical disc according to claim 21, wherein said second portion covers a file system boot area on the disc.

24. The optical disc according to claim 21, wherein said optical blocking material comprises a material that changes transparency in response to selective application of energy.

25. The optical disc according to claim 21, wherein said optical blocking material comprises a photosensitive dye.

26. The optical disc according to claim 21, wherein said second portion defines a pattern of text on the optical disc.

27. The optical disc according to claim 21, wherein said second portion comprises a ring of unactivated optical blocking material on the optical disc.

28. The system according to claim 21, wherein said second portion of the optical blocking material is sufficient to prevent functional play of the optical device.

* * * * *